United States Patent [19]
Bilange et al.

[11] Patent Number: 5,722,615
[45] Date of Patent: Mar. 3, 1998

[54] TRANSPORT AIRPLANE WITH FRONT EMPENNAGE

[75] Inventors: Thierry Bilange, Tournefeuille; Yvon Vigneron, Colomiers, both of France

[73] Assignee: Aerospatiale Societe Nationale Indusrielle, Paris, France

[21] Appl. No.: 433,727

[22] Filed: May 3, 1995

[30] Foreign Application Priority Data

May 3, 1994 [FR] France .................... 94 05371

[51] Int. Cl.⁶ .............. B64C 3/42; B64C 13/16; B64C 39/12
[52] U.S. Cl. .............. 244/45 A; 244/39; 244/48; 244/76 B; 244/89
[58] Field of Search .............. 244/45 A, 48, 244/39, 76 B, 76 C, 181, 195, 89, 218, 178

[56] References Cited

U.S. PATENT DOCUMENTS

| | | | |
|---|---|---|---|
| 3,215,374 | 11/1965 | Olshausen | 244/76 C |
| 4,542,866 | 9/1985 | Caldwell et al. | 244/45 A |
| 4,896,846 | 1/1990 | Strom | 244/45 A |
| 4,937,754 | 6/1990 | Buisson et al. | 364/463 |
| 4,949,269 | 8/1990 | Buisson et al. | 364/463 |
| 5,083,279 | 1/1992 | Burdoin | 244/181 |
| 5,395,073 | 3/1995 | Rutan et al. | 244/48 |

FOREIGN PATENT DOCUMENTS

| | | | |
|---|---|---|---|
| 0 033 053 | 8/1981 | European Pat. Off. | |
| 454549 | 10/1981 | European Pat. Off. | 244/181 |
| 0 084 686 | 8/1983 | European Pat. Off. | |
| 0 193 442 | 8/1986 | European Pat. Off. | |
| 2449592 | 9/1980 | France | |
| 1809815 | 4/1993 | U.S.S.R. | 244/89 |

*Primary Examiner*—Irna Lissi Mojica
*Attorney, Agent, or Firm*—Fisher, Christen & Sabol

[57] ABSTRACT

Airplane (1) including a mainplane (3), elevator aerodynamic surfaces (4) and a front canard empennage adjustable in orientation. This airplane includes:

a device for calculating (14) continuously receiving measurements:
of the speed (V) of the airplane with respect to the air,
of the centering (c) of the airplane (1),
of the flight altitude (H), and
of the mass (m) of said airplane and calculating the angular setting to be given to said planes (5) of the canard empennage, during phases of stabilized flight without atmospheric disturbances, so that the lift of said canard empennage corresponds, at any moment, to the smallest possible value of the drag of the airplane; and a device (9) for conferring an at least substantially constant lift on said empennage when the airplane in flight is not in a phase of stabilized flight without atmospheric disturbances.

5 Claims, 5 Drawing Sheets

TRANSPORT AIRPLANE WITH FRONT EMPENNAGE

It is known that everyday transport airplanes include a mainplane providing the lift and elevator aerodynamic surfaces, such as, for example, a rear horizontal stabilizer empennage provided with adjustable elevator control surfaces (for a subsonic airplane) or equally trailing-edge elevons of said mainplane (for a supersonic airplane without horizontal empennage). In these known transport airplanes, the pitch balancing and flight stability are obtained, for each position of the center of gravity, by the adjustment of said elevator aerodynamic surfaces, which contribute lift or negative lift, as appropriate, which are sufficient to generate a moment compensating for the moment generated by the mainplane.

As far as the pitch balancing proper is concerned, the interaction of the mainplane and of the elevator aerodynamic surfaces gives entire satisfaction. However, this is not so for the aerodynamic performance and for the mass of the airplane.

In fact, the elevator aerodynamic surfaces generate high drag. Moreover, the negative lift of said elevator aerodynamic surfaces have to be compensated for by exerting additional lift on the mainplane, entailing an increase in the aerodynamic loads applied to this mainplane and thus in the mass of the latter.

Obviously, these additional aerodynamic loads are, in their turn, the cause of an increase in drag.

In order to remedy these drawbacks, that is to say to reduce the drag and increase the lift of the airplane, while relieving the load on the mainplane, it has already been proposed to provide a canard empennage at the front of the airplane. Airplanes with a canard empennage are described, for example, in the French Patents FR-A-1 032 665 and FR-A-2 473 466, or in the magazine FLIGHT INTERNATIONAL, of 23 Jul. 1988, pages 22 et seq.

In order to produce a moment equivalent to a rear, negative-lift empennage, such a canard empennage generates lift which contributes to the overall lift of the airplane, so that the mainplane can be of smaller size than it would be without canard empennage, and a reduction in mass and in drag results therefrom. Hence, the addition of a front canard empennage makes it possible:

either to reduce the mainplane of an airplane, for a given fuselage;

or to expand the fuselage of an airplane, without having to increase the mainplane of said airplane.

Hence it is apparent, at first sight, that the arrangement of a canard empennage at the front of an airplane exhibits numerous advantages.

In reality, these advantages cannot be exploited fully since, as is known, a canard empennage entails the center of lift of the mainplane being moved forward, the amplitude of this forward movement being a function of the value of the lift gradient and of the lever arm of the canard empennage. It results therefrom that, when the airplane encounters gusts of wind and when the value of the lift of the canard empennage varies within wide limits, the forward movement of the point of application of the increase in lift of the mainplane also varies greatly, which entails instability of the airplane.

In order to avoid such imbalance rendering the airplane uncontrollable, it is therefore necessary for the canard empennage to be sufficiently small for its lift to be able to take only values which are not liable to be dangerous to the stability of the airplane. However, it is then impossible to optimize the overall drag of the airplane.

Moreover, in order not to further increase the risks of imbalance of the airplane, it is then necessary to keep the centering of the airplane within narrow limits.

Thus, the canard empennage destabilizes the airplane and must therefore contribute a limited lift which is not capable of improving the drag of the airplane significantly, and it entails centering constraints which do not seem to have been resolved by the prior art.

On this subject, it should be noted that the French Patent FR-A-1 032 665 and the magazine FLIGHT INTERNATIONAL, both mentioned above, relate respectively only to a passenger airplane and to an executive airplane, with a small-size canard empennage (with fixed incidence setting in the second case), in which the shifts in the center of gravity are limited. In contrast, it appears that the transport airplane of the French Patent FR-A-2 473 466 cannot be controllable, particularly if it is desired to maintain a correct range of loading, that is to say to allow the center of gravity to shift within a wide range of variation along the longitudinal axis of the airplane. In fact, it would then be necessary to use a canard empennage of large dimensions, which would increase the mass of the airplane and impose excessively high take-off and landing speeds. Moreover, this large canard empennage would render the airplane unstable.

It can therefore be seen, from the foregoing, that in an airplane with a front canard empennage, there is a conflict between:

increase in lift and reduction in drag, on the one hand; and structural lightening, balancing, stability, performance and flying qualities on taking-off and on landing, on the other hand.

That being so, as described for the passenger airplane in the magazine FLIGHT INTERNATIONAL, it is necessary to seek a compromise such as small-size canard empennage set at a fixed angle, contributing an increase in lift and a reduction in drag, which is not optimized but does not risk causing instability, or increasing the take-off and landing speeds, all relating to an airplane for which the centering varies very slightly.

The object of the present invention is to remedy the abovementioned drawbacks, and it relates to a transport airplane which simultaneously exhibits the following advantages:

optimized drag, capable of leading to a reduced fuel consumption;

performance aspects and flying qualities which are enhanced at low speeds (take-off and landing);

structural lightening; and great operational flexibility (low sensitivity to the centering of the load, good maneuverability, increase in flight ceilings).

To this end, according the invention, the airplane including a mainplane, elevator aerodynamic surfaces and a front canard empennage the planes of which are adjustable in angular orientation about an axis transverse to the longitudinal axis of said airplane, by the action of actuating members, is noteworthy in that it includes:

calculating means, continuously receiving at least measurements:

of the speed of the airplane with respect to the air, of the centering of the airplane, of the flight altitude, and of the mass of said airplane, and calculating the angular setting to be given to said canard empennage planes, during stabilized flight phases (climb, level flight, descent) without atmospheric disturbances so that the lift of said canard empennage corresponds at every instant to the lowest possible value of drag of the airplane, said calculating means controlling said actuating members so that they actuate said planes of the canard empennage as a consequence; and means conferring on said canard empennage a lift which is at least substantially constant when the airplane in flight is not in a phase-of stabilized flight without atmospheric disturbances.

Thus, during the phases of stabilized flight (climb, level flight, descent) without atmospheric disturbances, the drag is a minimum at all times and the same is true of the fuel consumption. In all other flight conditions, that is to say with atmospheric disturbances or when maneuvering, the lift of the canard empennage is constant, so that there is no longer any risk of instability. It is then possible to give the airplane in accordance with the present invention enhanced performance and flying qualities corresponding to those of the same airplane not equipped with a canard empennage, while benefitting from a wide centering range.

According to a first embodiment, said means conferring an at least substantially constant lift on the canard empennage render said canard empennage floating, which allows it to orient itself freely in the wind.

In a variant, said means conferring an at least substantially constant lift on the canard empennage include calculating means having in memory the lift gradient of said canard empennage and continuously receiving measurements of the incidence of the canard planes, of the pitch rate of the airplane, of the forecast speed of the speed of the airplane with respect to the air, in front of the airplane and calculating the angular setting to be given to said planes of the canard empennage, when the airplane in flight is not in a phase of stabilized flight without atmospheric disturbances, so that the lift of said canard empennage is at least substantially constant, said calculating means controlling said planes of the canard empennage as a consequence.

In the latter case, said calculating means can control said canard empennage planes via said actuating members.

It is advantageous, however, for said canard planes to be provided with trailing edge control surfaces which are adjustable in angular orientation about axes by the action of other actuating members, and for said calculating means to control said canard empennage control surfaces via said other actuating members.

Preferably, said elevator aerodynamic surfaces are formed by a rear horizontal stabilizer empennage the planes of which are adjustable in angular orientation about an axis transverse to the longitudinal axis of said airplane and said calculating means moreover, during the phases of stabilized flight without atmospheric disturbances, control the orientation of said planes of the rear horizontal empennage so that, at any moment, the triplet of the values of the lift of the mainplane, of the lift of said canard empennage and of the lift of said rear horizontal empennage corresponds to the lowest possible value of the drag of the airplane.

The figures of the attached drawing will give a good understanding of how the invention can be produced. In these figures, identical references designate similar elements.

Figure 3:
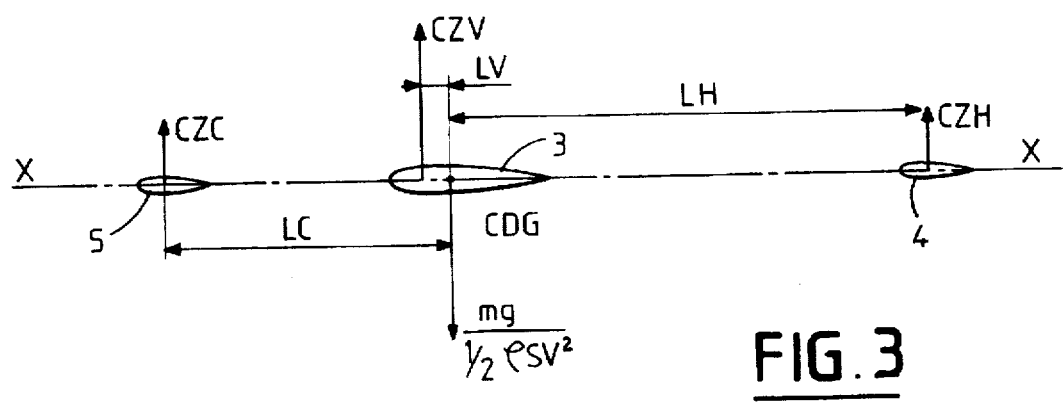

FIG. 3 diagrammatically illustrates the system of forces applied in flight to the airplane of the invention.

Figure 4A:
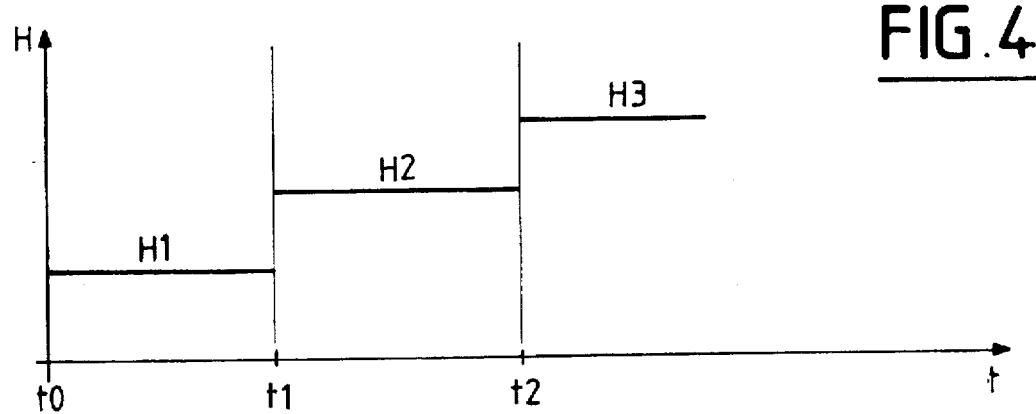
Figure 4B:
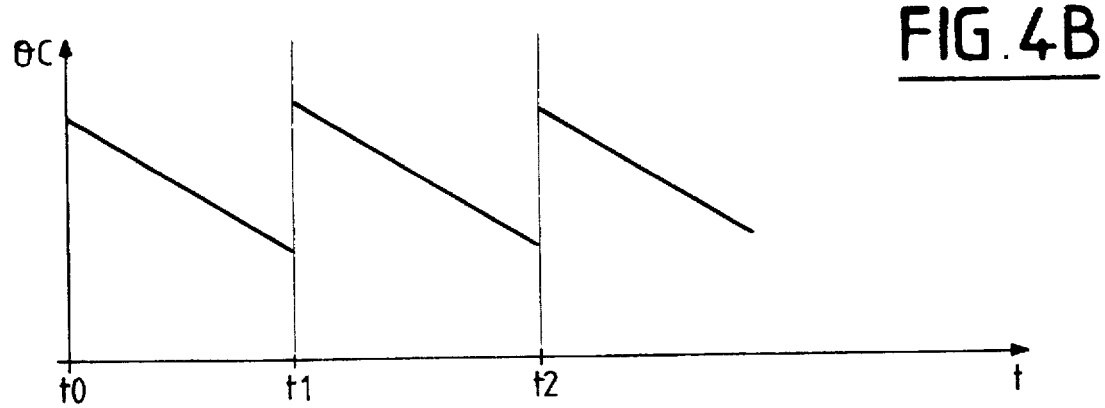

FIGS. 4A and 4B are diagrams illustrating the variation in the angular setting of the canard empennage during a phase of straight-and-level flight without atmospheric disturbances, as well as during such phases of flight corresponding to different altitude levels.

Figure 5:
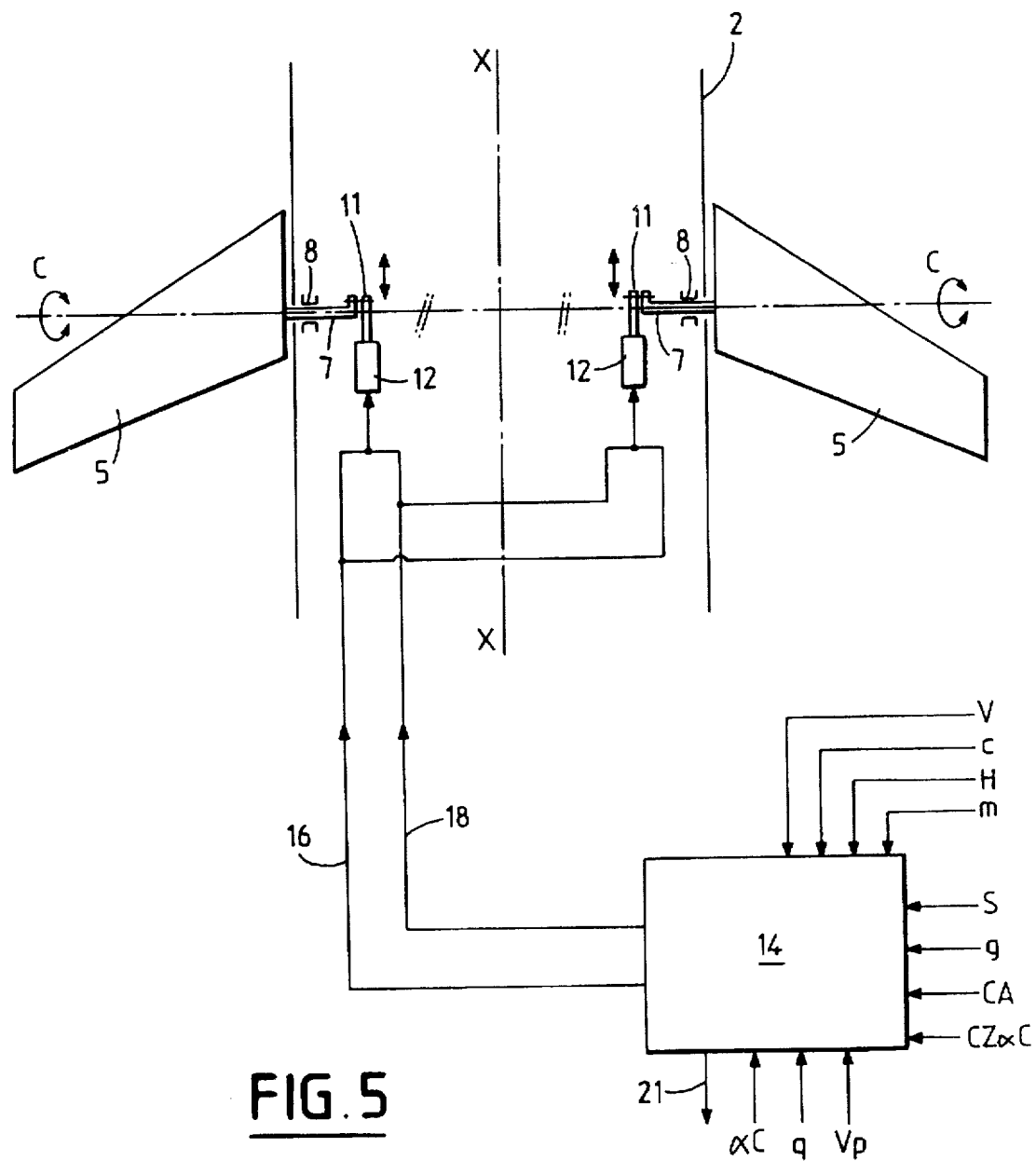
Figure 6:
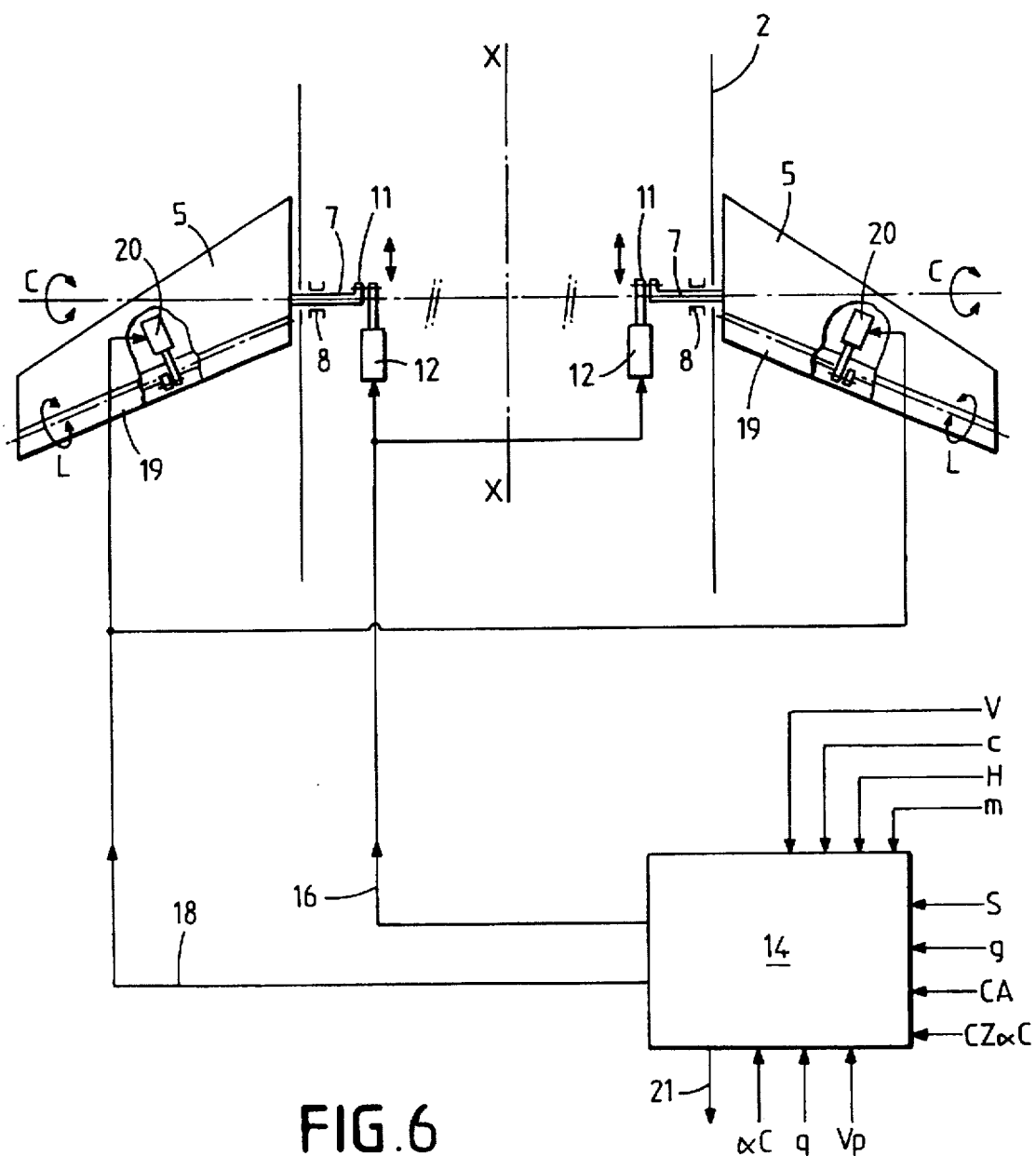

FIGS. 5 and 6 are diagrams of variant embodiments of the invention.

Figure 7:
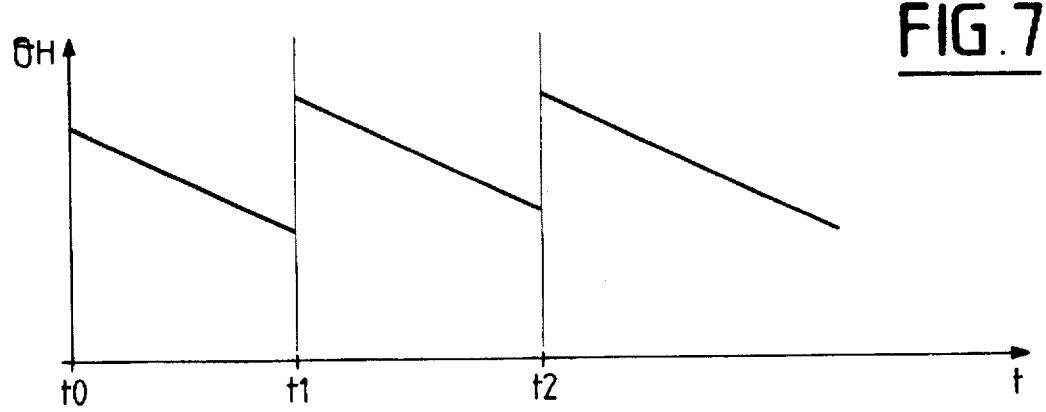

FIG. 7 illustrates the variations in the setting of the rear stabilizer empennage, which is adjustable in angular orientation, in relation to FIGS. 4A and 4B.

Figure 1:
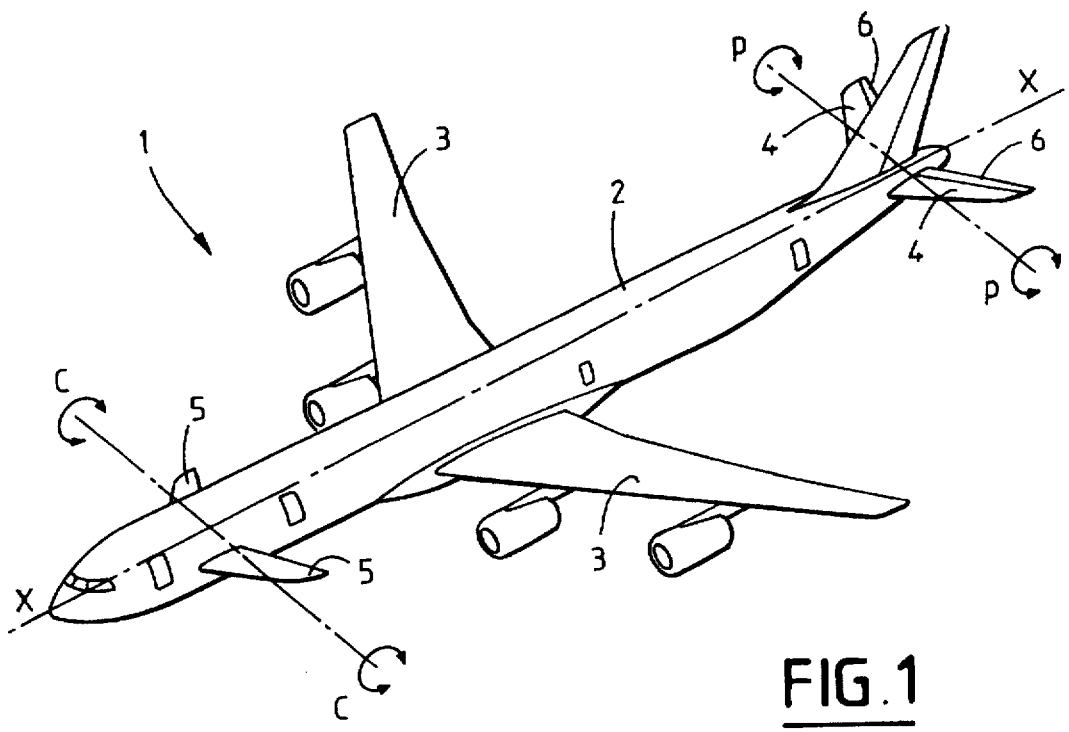
FIG. 1 is a view in perspective of a transport airplane with canard empennage in accordance with the invention.

The transport airplane 1, in accordance with the present invention and represented in FIG. 1, includes a fuselage 2 with longitudinal axis X—X, to which fuselage are attached, among other things, two wings 3 forming the mainplane, a horizontal rear empennage (4, 4) provided with two stabilizer planes 4 and a front canard empennage (5, 5) provided with two canard planes 5. The two wings 3, the two rear stabilizer planes 4 and the two front canard planes 5 are, respectively, symmetric with one another with respect to the longitudinal axis X—X.

The wings 3 carry flaps, ailerons, slats, etc (not represented), as well as propulsion engines (represented, but not referenced).

Each of the rear stabilizer planes 4 is provided with an elevator control surface 6 and can possibly be adjusted in angular orientation by rotation about a transverse axis P—P, perpendicular to the longitudinal axis X—X, said rear stabilizer planes 4 being coupled in rotation.

Each of the front canard planes 5 can be adjusted in angular orientation by rotation about a transverse axis C—C, perpendicular to the longitudinal axis X—X.

Figure 2:
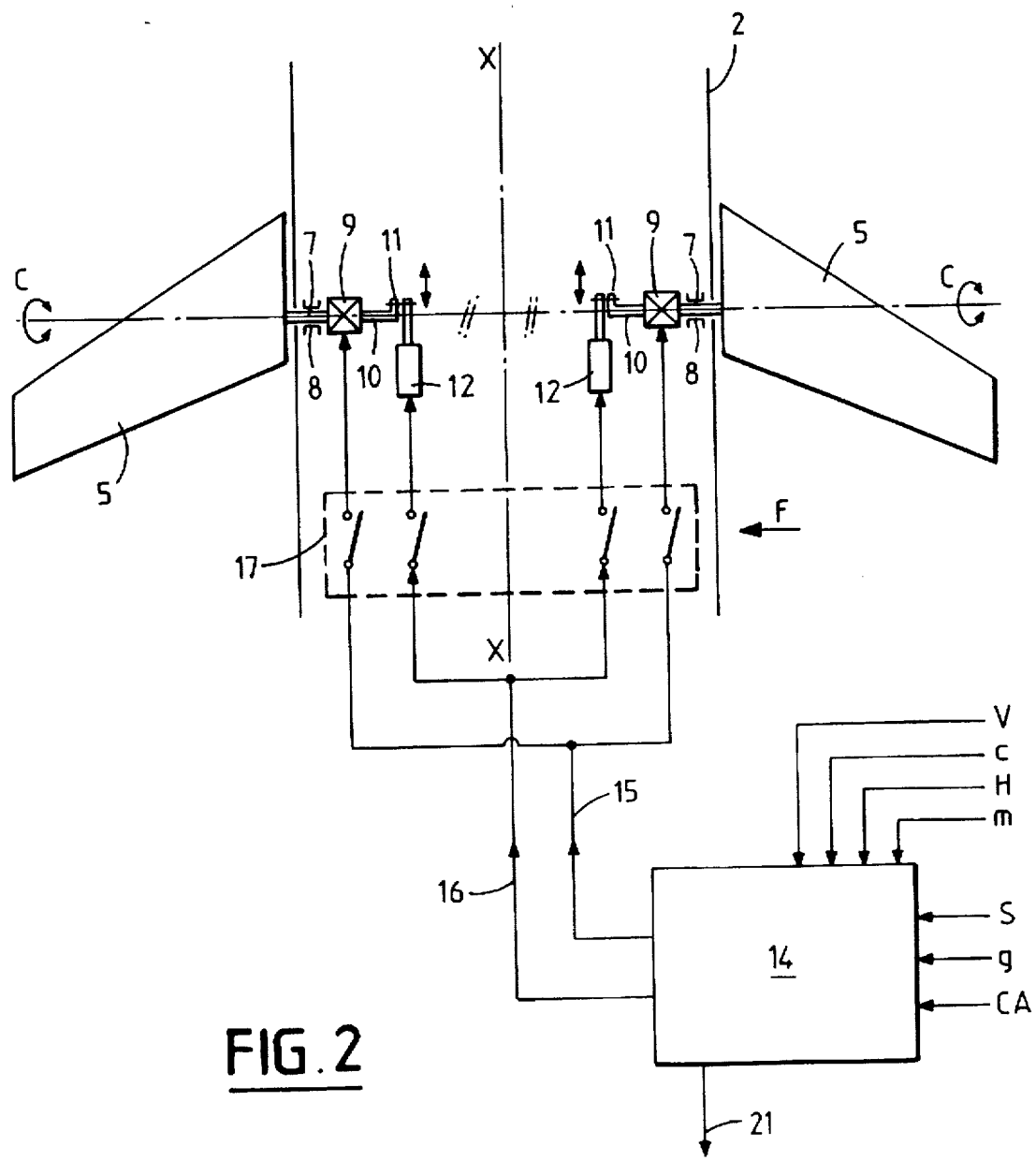
FIG. 2 is a diagrammatic view of a first embodiment of the present invention.

In the diagrammatic embodiments represented in FIGS. 2, 5 and 6, each canard plane 5 is, to this end, secured to a shaft 7 carried freely in journal bearings 8 integral with the airplane 1.

In the specific example of FIG. 2, each shaft 7 may be coupled, by a controlled coupling 9, to a shaft 10, carrying a crankpin 11. The crankpins 11 are articulated to actuating members 12, for example jacks.

The device of FIG. 2 further includes a computer 14, mounted on board the airplane 1, capable of controlling the two couplings 9 and the two actuating members 12 in synchronism, respectively via links 15 and 16 and a control switch 17.

The computer 14 carries in memory the aerodynamic characteristics CA of the canard planes 5, the reference surface S of the airplane 1, the acceleration g due to gravity, as well as the abscissae along the X—X axis of the points of application of the lift of the wings 3, of the lift of the rear stabilizer planes 4 and of the lift of the front canard planes 5. Moreover, the computer 14 receives the following as parameters:

the instantaneous speed V of the airplane 1, calculated for example by the ADIRS (Air Data Inertial Reference System) of the airplane (not represented);

the centering c of the airplane, that is to say the position of the center of gravity CDG of the latter, along the longitudinal axis X—X. The centering c may originate from a system such as that described in the American Patents U.S. Pat. No. 4,937,754 and U.S. Pat. No. 4,949,269, or from the implementation of the known method consisting in weighing the airplane on the ground, in measuring the quantities of fuel in the various tanks, in measuring or estimating the loading of passengers and of freight and in summing these data on a mass and centering calculator, then in transferring each of these data items continuously onto the said calculator in order to monitor the change in the position of the center of gravity. In the latter case, the various operations are carried out either manually, or by the use of a computer which takes account of the starting data, and, continuously throughout the flight, transfers the variations in mass due to the reduction and to the transfer of fuel;

the altitude H of the airplane, delivered in a known way by an altimeter or altimetric probes (not represented); and the mass m of the airplane, calculated, for example, by the FMS (Flight Management System) of the airplane (not represented), or continuously estimated from weighing on the ground, as explained above in connection with the centering c.

The various forces applied to the airplane 1 in flight have been represented in the diagram of FIG. 3. These are:

the main lift CZV generated by the mainplane 3, 3;

the lift CZH generated by the rear stabilizer planes 4, 4;

the lift CZC generated by the front canard planes 5, 5; and the weight mg of the airplane, divided by the kinetic pressure $\frac{1}{2} \rho SV^2$ and applied to the center of gravity CDG of the airplane 1, with m=mass of the airplane, g=acceleration due to gravity, $\rho$=density of air, S=reference surface of the airplane 1 and V=instantaneous speed of the airplane 1 with respect to the air.

Lift generation by the airplane 1 in flight requires that $$CZV+CZH+CZC=mg/\tfrac{1}{2}\rho SV^2, \quad (1)$$

while for pitch equilibrium of said airplane, it is necessary that $$CZV \times LV + CZH \times LH + CZC \times LC = 0 \quad (2)$$

calling LV, LH and LC respectively the distances (or lever arms) separating the center of gravity CDG of the airplane from the points of application of the lift CZV of the wings 3, of the lift CZH of the stabilizer planes 4 and of the lift CZC of the canard planes 5.

Thus it is seen that in order to meet the two constraints of lift and equilibrium, three parameters exist, namely the main lift CZV, the lift CZH of the rear empennage and the lift CZC of the canard empennage. It is thus possible to provide the best drag for the airplane 1, for a given overall balanced lift, by optimizing all three lifts CZV, CZH and CZC. This leads to minimizing the overall drag of the airplane 1, by reducing the load on the wings 3 via the empennages 4 and/or 5.

In fact, it is known that, at least to a first approximation, the overall drag RX of the airplane 1 may be expressed in the form $$RX=RXO+\tfrac{1}{2}\rho SV^2[A.CZV^2+B.CZH^2+C.CZC^2+D.CZV.CZH+E.CZV.CZC+F.CZH.CZC] \quad (3)$$

an expression in which RXO and A, B, C, D, E and F are constants, functions of the geometric configuration of the airplane 1.

It is thus possible to comply with equations (1) and (2) for lift and for equilibrium while minimizing the drag RX, by adjustment of the lift CZC of the canard empennage 5 (and possibly of the lift CZH of the stabilizer empennage 4, as will be seen below).

In the light of the preceding comments, the operation of the device of FIG. 2 is as follows.

I When the airplane 1 is maneuvering and/or when it is passing through atmospheric disturbances, the control switch 17 is open (position represented in FIG. 2), so that neither the couplings 9, nor the actuating members 12 are controlled by the computer 14. The shafts 7 are free to turn in their bearings 8. Consequently, the front canard planes 5 are floating and orient themselves spontaneously and freely in the wind by pivoting about the axis C—C, so that their moment with respect to said axis is zero. The canard empennage thus generates lift CZC of constant value which cannot destabilize the airplane 1, since the lift gradient of said canard empennage is zero.

II When the airplane 1 is in stabilized flight (for example straight-and-level at constant altitude H) and when no atmospheric disturbances exist, the control switch 17 passes, manually or automatically, from its open position to its closed position (arrow F). It results therefrom that the link 15 drives the couplings 9 so that the latter couple the shafts 7 and the shafts 10, which become integral in rotation about the axis C—C. Moreover, the actuating members 12 are driven by the computer 14, through the link 16.

In this case, from the parameters V, c, H, m, CA, $\rho$ and g, the computer 14 calculates the value of the setting $\theta C$ of the canard planes 5 (angular position $\theta C$ of said planes about the axis C—C) which corresponds to the value of the lift CZC of the canard empennage giving the lowest drag RX. To do that, the computer 14 employs equations (1), (2) and (3) above, having regard to the fact that the altitude H is representative of the density $\rho$ of the air, and that the centering makes it possible to define the distances LV, LM and LC.

This value $\theta C$ of setting of the canard planes 5 is imposed by the computer 14, by virtue of the action of the actuating members 12 which, by pulling or pushing the crankpins 11, turn the shafts 10, and thus the shafts 8 which are coupled to them, by virtue of the couplings 9.

Thus, at any moment of such stabilized flight, it is possible to minimize the drag of the airplane 1 and thus its fuel consumption.

It will be noted that, during straight-and-level flight, since the mass m reduces over time due to the consumption of fuel and the other parameters are assumed constant, the overall lift of the airplane decreases, so that the lift CZC of the canard empennage must decrease. The same is therefore true for the angular setting $\theta C$ of said canard empennage.

During cruising flight, the pilot, due to the reduction in mass of the airplane 1, may make one or more changes to higher-altitude straight-and-level flight, for the purpose of optimizing the fuel consumption.

During such a change in level, since the altitude increases and the other parameters remain approximately constant, the lift may remain constant, but the lift coefficient of the airplane increases, since the density of the air $\rho$ falls. The setting of the canard empennage 5, 5 must therefore be increased.

In FIGS. 4A and 4B, an example of cruising flight of this type has been illustrated as a function of the time t. Between instants t0 and t1, the airplane 1 is flying in stabilized straight-and-level flight at an altitude H equal to H1, then, at the instant t1, the airplane moves to straight-and-level flight of altitude H2 higher than H1, then at the instant t2 to straight-and-level flight of altitude H3 higher than H2, etc (FIG. 4A). FIG. 4B illustrates that during each straight-and-level flight at altitude H1, H2, H3 etc, the setting $\theta C$ of the canard empennage decreases, but that said setting increases when the airplane changes from one level to a higher level.

During the maneuvers making it possible to move from one level to another, the control switch 17 is open so that the canard planes 5 float aerodynamically.

Needless to say if, in the course of cruising flight, the centering c or the speed V were to vary, the setting θC would change so as to ensure optimization of the drag at all times.

III if, when the airplane 1 is in stabilized flight at a level H1, H2, H3 etc, an atmospheric disturbance appears, such as a gust, the control switch 17 is opened manually or automatically (inverse direction to the arrow F) in order to make the canard planes 5 floating and avoid the airplane 1 being unbalanced. This command triggers a transient phase, in which the lift of a canard empennage 5, 5 tends towards the equilibrium lift with zero moment. This results in a rapid change in the distribution of the lift, which has to be counted by the rear empennage 4, 4. This drawback can be corrected by the following variant embodiment.

The variant embodiment of the invention, illustrated diagrammatically by FIG. 5, allows continuous control of the setting of the planes 5 of the canard empennage, even during maneuvers and gusts. With respect to the embodiment of FIG. 2:

- the shafts 7, the bearings 8, the crankpins 11, the actuating members 12, the computer 14 and the control line 16 for control of the actuating members 12, in straight-and-level flight, are again found;
- the couplings 9 and the shafts 10 have been dispensed with and the crankpins 11 are directly secured to the shafts 7;
- in addition to the information V, c, H, m, S, g and CA, the computer 14 holds in memory the lift gradient $CZ\alpha C$ of the canard empennage 5, 5, which is a constant which is characteristic of it and which is determined, for example, by flight or wind tunnel trials, and said computer 14 receives:
    - the measurement of the incidence $\alpha C$ of the canard planes 5, delivered, for example, by an incidence probe (not represented);
    - the measurement of the-pitch rate g of the airplane, delivered, for example, by its inertial unit (not represented); and
    - the forecast measurement Vp of the speed of the airplane with respect to the air, in front of the airplane, delivered for example by a laser velocimetry device (not represented);
- the computer 14 calculates the quantity $$Q = CZ\alpha C \ (\alpha C - g/Vp \times LC) \quad (4)$$

which represents the lift CZC of the canard empennage 5, 5, and it then determines the value I of the setting θC for which the quantity Q is constant; and

- the computer 14, via the link 18, sends this setting value I to the actuating members 12, so that the latter alter the setting of the canard empennage so that, throughout a maneuver or throughout an atmospheric disturbance, the lift CZC remains constant.

Thus, the canard planes 5 are subjected to double control, namely:

- a first slow control, of long duration, providing the best aerodynamics possible for the airplane and relating to straight-and-level cruising flight, as described with regard to the device of FIG. 2; and
- a second high-speed control, of short duration, providing a constant value of lift of the canard empennage, this constant value certainly not being optimal as far as the drag of the airplane 1 is concerned, but avoiding destabilization of the airplane during a maneuver or a gust.

For executing this second control, the fluctuations in speed (in magnitude and direction) in front of the airplane 1 are measured (for example using the laser velocimetry device mentioned above), at a sufficient distance to give the computer 14 the time to carry out the calculation of the quantity Q according to equation (4) and to impose the setting value I on the canard planes 5. The measurements of these fluctuations are, obviously, sequential, and the sampling precision is sufficient to reconstitute and predict the gust or the maneuver and sufficient that, at every instant of the maneuver or the passage of the gust, the setting value I supplies as constant as possible a value of the lift CZC.

In the embodiment variant of FIG. 6, the canard planes 5 are provided with trailing edge control surfaces 19, capable of pivoting about axes L—L, by the action of actuating members 20. In this case, the link 16 (as in the embodiments of FIGS. 2 and 5) controls the actuating members 12, while the link 18 controls the actuating members 20 (and no longer the actuating members 12, as was represented in FIG. 5).

Thus, the slow control, of long duration, is applied to the planes 5 themselves, while the high-speed control, of short duration, is applied to the control surfaces 19.

If, as represented in FIG. 1, the rear stabilizer empennage 4, 4 is of the PHR type, that is to say adjustable in angular orientation about an axis P—P transverse to the longitudinal axis X—X, the computer 14 includes an output 21 for control of the setting θH of said rear stabilizer empennage 4, 4 during the phases of straight-and-level cruising flight without atmospheric disturbances. The computer 14 then controls the usual specific actuating members (not represented) which are provided for setting said rear stabilizer empennage.

In fact, as has already been mentioned above in connection with equations (1) and (2), three flight control parameters exist, namely the lifts CZV, CZH and CZC, in order to meet the two constraints of lift and of equilibrium in pitch as represented by said equations (1) and (2). Thus there exists an infinity of triplets of values of the lift CZV of the wings 3, of the lift CZH of the rear stabilizer empennage 4, 4 and of the lift CZC of the front canard empennage 5, 5 for satisfying said constraints of lift and of equilibrium in pitch.

On the other hand, it can be shown, as explained previously, that it is possible to determine the only triplet of values of CZV, CZH and CZC making it possible to minimize the drag and thus the cruising consumption.

In a way similar to what was described above in connection with the lift CZC, the lift CZH of the rear stabilizer empennage 4, 4 is a function of the mass m of the centering c, of the speed V and of the altitude H. Thus, knowing the aerodynamic characteristics of said rear stabilizer empennage, it is possible to determine, in the computer 14, the value of the setting θH to give the planes 4 so that they generate the value of lift CZH associated with the corresponding values of lift CZV and CZC, making it possible to minimize the drag.

In FIG. 7 the variations in the setting θH in the case of the flight represented in FIG. 4A have been illustrated diagrammatically (by analogy with FIG. 4B).

Although above, with respect to FIGS. 2, 5 and 6, embodiments were described in which the canard planes 5 are coupled in angular orientation, it goes without saying that such a coupling is not an obligation and that the controls for said canard planes may be individuals.

Moreover, although the airplane represented in FIG. 1 is of the subsonic type, it can easily be understood that the present invention applies without restriction to supersonic transport airplanes. In this case, said elevator aerodynamic surfaces 4 are elevons of the trailing edge of the mainplane.

We claim:

1. A transport airplane including a mainplane, elevator aerodynamic surfaces and a front canard empennage which is adjustable in angular orientation about an axis transverse to the longitudinal axis of said airplane by the action of actuating members, said airplane further including calculating means which continuously receive measurements:

of the speed of the airplane with respect to the air;

of the flight altitude;

of the centering of the airplane;

of the mass of the airplane;

of the incidence of the canard empennage;

of the pitch rate of the airplane;

of the forecast speed of the speed of the airplane with respect to the air, in front of the airplane;

said calculating means having in memory the lift gradient of said canard empennage and calculating the angular setting to be given to said canard empennage such that:

during the phases of stabilized flight of the airplane without atmospheric disturbances, the lift of said canard empennage corresponds at every instant to the lowest possible value of the drag of the airplane; and such that when the airplane is not in a phase of stabilized flight without atmospheric disturbances, the lift of said canard empennage is at least substantially constant, thereby allowing said calculating means to control said canard empennage.

2. The airplane as claimed in claim 1, which is of the supersonic type and in which said elevator aerodynamic surfaces (4) are trailing-edge elevons of the mainplane (3, 3).

3. The airplane as claimed in claim 1, in which said elevator aerodynamic surfaces are formed by a rear horizontal stabilizer empennage the planes (4) of which are adjustable in angular orientation about an axis (P—P) transverse to the longitudinal axis (X—X) of said airplane (1), wherein said calculating means (14) moreover, during the phases of stabilized flight without atmospheric disturbances, control the orientation of said planes (4) of the rear horizontal empennage so that, at any moment, the triplet of the values of the lift of the mainplane (3, 3), of the lift of said canard empennage (5, 5) and of the lift of said rear horizontal empennage (4, 4) corresponds to the lowest possible value of the drag of the airplane.

4. The airplane as claimed in claim 1, wherein said calculating means (14) control said canard empennage via said actuating members (12).

5. The airplane as claimed in claim 1, wherein said canard empennage (5) is provided with trailing edge control surfaces (19), which are adjustable in angular orientation about axes (L—L) by the action of other actuating members (20) and wherein said calculating means (14) control said control surfaces (19) of the canard empennage via said other actuating members (20).

* * * * *

UNITED STATES PATENT AND TRADEMARK OFFICE
CERTIFICATE OF CORRECTION

PATENT NO. : 5,722,615
DATED : March 3, 1998
INVENTOR(S) : Thierry Bilange, Yvon Vigneron It is certified that error appears in the above-indentified patent and that said Letters Patent is hereby corrected as shown below:

On the title page item [73],
        should read -- Aerospatiale Societe
                         Nationale Industrielle --

Signed and Sealed this

Seventeenth Day of November, 1998

*Attest:*

BRUCE LEHMAN

*Attesting Officer*      *Commissioner of Patents and Trademarks*